July 8, 1924.
A. R. LONG
GEAR SHIFT LOCK FOR AUTOMOBILES
Filed July 31, 1923    3 Sheets-Sheet 1
1,500,948
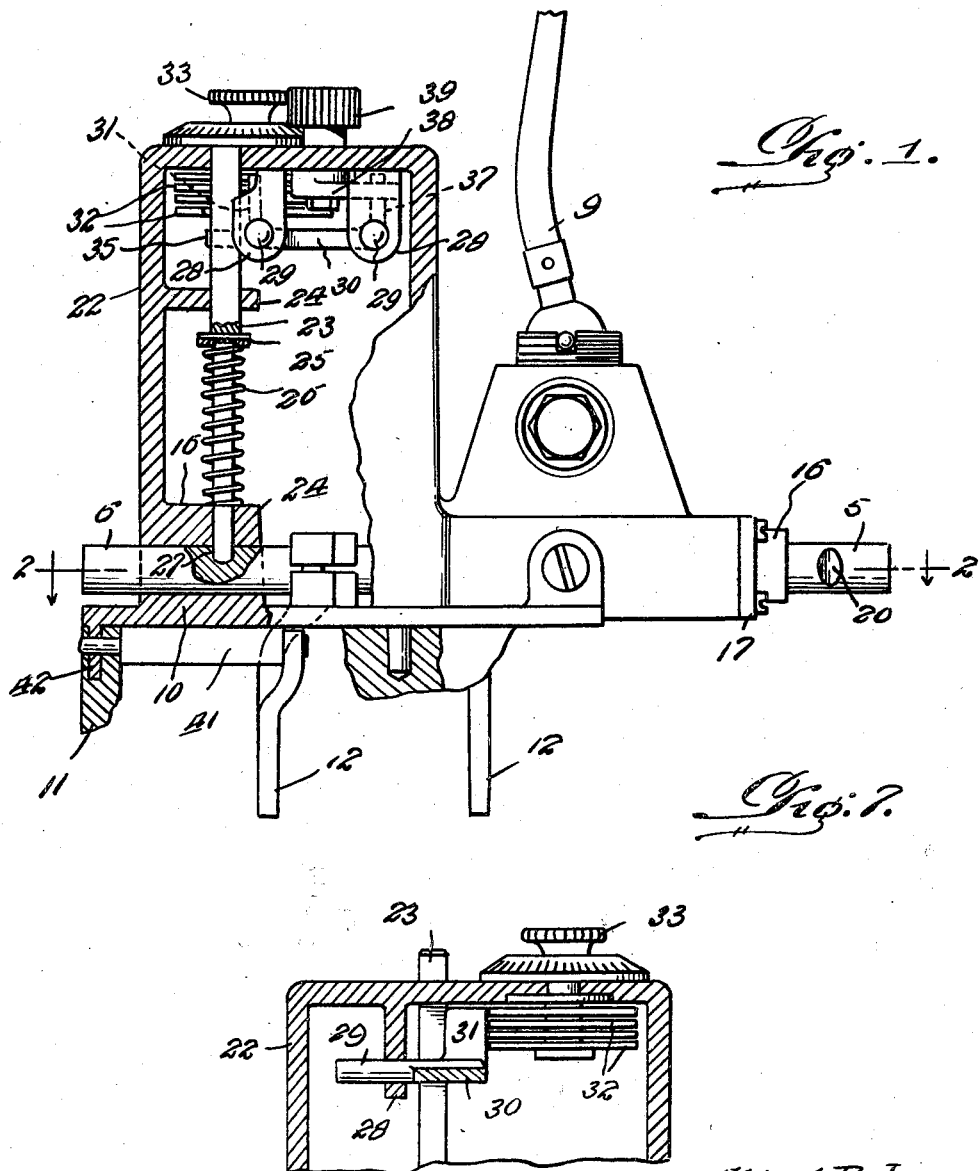

July 8, 1924.
A. R. LONG
1,500,948
GEAR SHIFT LOCK FOR AUTOMOBILES
Filed July 31, 1923    3 Sheets-Sheet 2
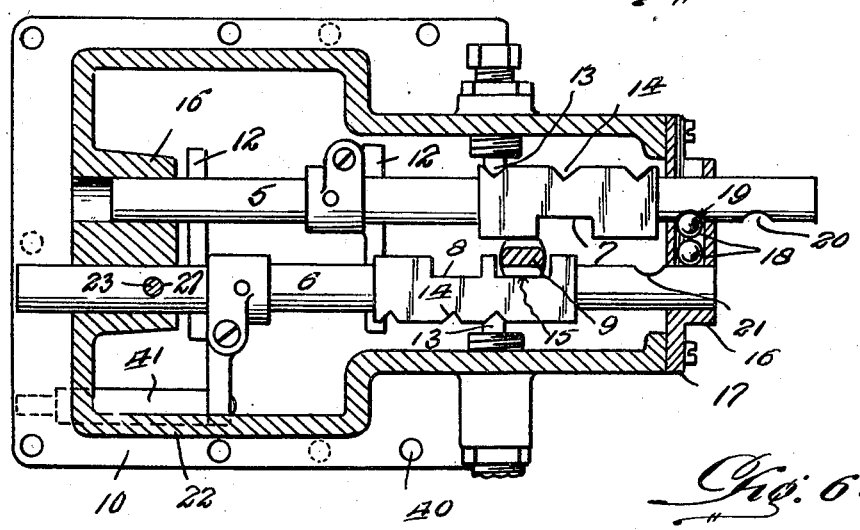
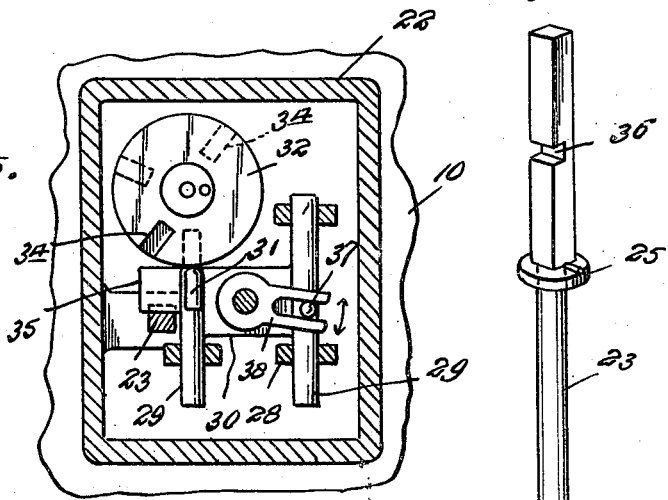

July 8, 1924.  
A. R. LONG  
1,500,948

GEAR SHIFT LOCK FOR AUTOMOBILES

Filed July 31, 1923  3 Sheets-Sheet 3

Albert R. Long.  
Inventor

Witnesses:

Patented July 8, 1924.

1,500,948

UNITED STATES PATENT OFFICE.

ALBERT R. LONG, OF RANSHAW, PENNSYLVANIA.

GEAR-SHIFT LOCK FOR AUTOMOBILES.

Application filed July 31, 1923. Serial No. 654,820.

*To all whom it may concern:*

Be it known that I, ALBERT R. LONG, citizen of the United States, residing at Ranshaw, in the county of Northumberland and State of Pennsylvania, have invented certain new and useful Improvements in Gear-Shift Locks for Automobiles, of which the following is a specification.

This invention relates to certain new and useful improvements in locking devices for transmission gear shift mechanisms and has particular reference to the provision of an improved means for permitting the gear shifting mechanism to be set with the transmission simultaneously positioned with both the reverse and high speed gears in mesh, together with means for locking the gear shifting mechanism with the gear so positioned.

The primary object of the invention is to provide means whereby the reverse gear of a motor vehicle transmission may be placed in mesh and allowed to stay in mesh while the gear shift lever is operated to additionally set the gear shift mechanism in high speed position, together with means to automatically lock the reverse gear in mesh when the mechanism is operated to place the high speed gear in operative position, and means under manual control for locking the gear shifting member of the high speed gear, so that the transmission is locked with the reverse and high speed gears simultaneously operative or in mesh, whereby unauthorized movement of the vehicle is prevented in an efficient manner.

A further object of the invention is to provide means for automatically locking the transmission cover against removal when the reverse and high speed gears are in mesh, which means is automatically released when the gear shift lever is returned to neutral position with the reverse and high speed gears out of mesh.

A further object of the invention is to provide means whereby conventional forms of gear shift mechanism may be modified for effectively locking the reverse and high speed gears simultaneously in mesh so that unauthorized movement or operation of the vehicle is effectively prevented and theft of the vehicle thereby rendered unlikely.

Still another object is to provide a locking device of the above kind which embraces the desired qualities of simplicity and durability of construction as well as efficiency in operation.

With the above general objects in view, and others that will become apparent as the nature of the invention is better understood, the same consists in the novel form, combination and arrangement of parts, hereinafter more fully described, shown in the accompanying drawings, and claimed.

In the drawings, wherein like reference characters indicate corresponding parts throughout the several views:

Figure 1 is a fragmentary view, partly in vertical section and partly in side elevation, of a gear shifting mechanism equipped with a locking device constructed in accordance with the present invention.

Figure 2 is a horizontal sectional view taken substantially on the line 2—2 of Figure 1, with the mechanism locked in position wherein the reverse and high speed gears are operatively engaged or meshed.

Figure 5 is a horizontal sectional view, taken on a plane above the tumbler discs of the manually controlled locking device.

Figure 6 is a perspective view of the locking bolt for the high speed gear shifting rod.

Figure 7 is a fragmentary vertical sectional view of the device shown in Figures 4 and 5.

Figure 3:
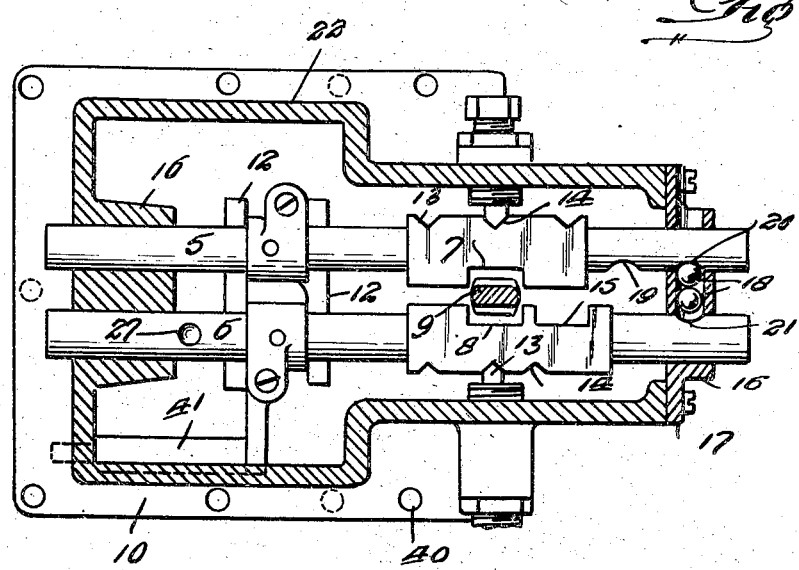
Figure 3 is a view similar to Figure 2, with the mechanism in neutral position.

Referring more in detail to the drawings, 5 and 6 indicate the conventional parallel sliding rods of a gear shift mechanism which are provided with notches 7 and 8 in the inner side thereof adapted for selective adjusting of the lower end of a gear shift lever 9 for selectively moving said rod so as to change the speed or direction of travel of the vehicle in a well known manner. These rods 5 and 6 are adapted to be operatively connected to the transmission gearing in any well known manner but in the form of the invention illustrated, the rods 5 and 6 are mounted above the cover 10 of the transmission casing 11, and said rods are provided upon their forward ends with shifting forks 12 that depend into the casing 11 and have direct operative connection with the clutch mechanism of the transmission (not shown). By way of explanation, it is noted that when the rod 5 is moved rearwardly to the position shown in Figure 2, the reverse gear will be in mesh, while when the rod 6 is moved forwardly to the position shown in the same figure, the high speed gear will be in mesh. On the other hand, when the rods 5 and 6 are positioned as shown in Figure 3 with the lever 9 disposed co-incident with both of the notches 7 and 8, the lever is in neutral position with all of the gears out of mesh, and the driving connection to the motor of the vehicle disconnected.

It is further noted that when the rod 6 is moved rearwardly beyond the position shown in Figure 3, the second speed gear is in mesh, while when the rod 5 is moved forwardly beyond the position shown in Figure 3, the first speed gear is in mesh. The usual latches 13 cooperating with notches 14 in the outer sides of the rods 5 and 6 are shown in Figures 2 and 3 for holding the rods 5 and 6 in any of their set positions, and it will be seen that each rod has three positions and consequently is provided with three notches for selective reception of the latches 13.

The above construction of conventional gear shift mechanism will prevent meshing of more than one gear at a time because, before one rod can be shifted, the other will necessarily have to be returned to neutral position. In accordance with the present invention, the rod 6 is provided with a second notch as at 15, rearwardly of the notch 8 and in the inner side of the rod in such position that when the rod 5 is moved rearwardly for meshing the reverse gear, the lever 9 will be disposed in alignment with the notch 15 so that the reverse gear may be left in mesh and the lever 9 shifted into the notch 15 for forwardly moving the rod 6 so as to mesh the high speed gear. Thus, by means of a simple modification of common forms of gear shifting mechanism, the driver is enabled, simultaneously to place both the reverse and high speed gears into operative position or in mesh.

The cover 10 of the transmission casing 11 is formed in the usual manner to provide a chamber within which the rods 5 and 6 are disposed, and these rods are suitably guided for reciprocating movement by means of bearings 16 provided at the ends of the cover and through which said rod projects. The chamber in the cover 10 is closed at one end by means of a plate 17 which has a transverse pocket in which are positioned a pair of spherical locking members 18. The rear end of the rod 5 is provided with a pair of notches as at 19 and 20 at the inner side thereof, while the rear end of the rod 6 is provided with a similar notch at its inner side, as at 21. The notches 20 and 21 are transversely aligned, and aligned with the locking members 18 when the rods 5 and 6 are set in neutral position as shown in Figure 3, so that said locking members will automatically shift toward the rod 6 and out of the notch 20 when the rod 5 is moved rearwardly to reverse gear position. When the rod 5 is thus moved rearwardly to reverse gear position the notch 19 is brought into alignment with the locking members 18 and the notch 21 so that said members 18 are free to shift laterally in the opposite direction to engage the notch 19 and thereby move out of the notch 21 for permitting forward shifting of the rod 6. As soon as the rod 6 is moved forwardly, the notched portion thereof will engage the disc locking member 18 for effectively holding the other locking member 18 in the notch 19 of the rod 5, so that the last named rod is effectively held against being shifted with the reverse gear in mesh.

Figures 4, 8:
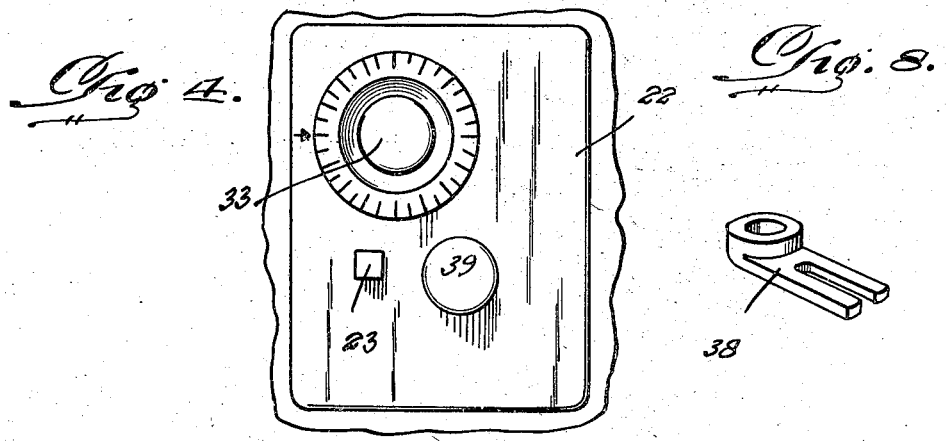
Figure 4 is a fragmentary top plan view of the device shown in Figure 1.
Figure 8 is a perspective view of the shifting fork for the commutation disc controlled bolt of the manually operable lock.

In accordance with the present invention, the forward part of the cover 10 is provided with a rigid upright enlargement 22, which forms the housing of a commutation or other manually controlled lock. Altho this lock may greatly vary in accordance with the desires of the user or various conditions influencing the installation of the invention, the same is shown as of the rotary tumbler commutation type and the same embodies a vertical bolt 23 that is suitably guided as at 24 for reciprocating movement and that has its upper end extending through an opening in the top wall of the enlargement 22 as shown in Figures 1 and 4. The lower end portion of the locking bolt 23 is reduced so as to provide a shoulder against which is positioned a washer 25 which forms an abutment for the upper end of a helical spring 26 that encircles the reduced lower portion of said bolt. The spring 26 has its lower end in engagement with one of the guides 24 of the bolt 26, so that the latter is normally yieldingly elevated with the upper end of the bolt projected above the top of the enlargement 22. The forward end of the rod 6 is provided with a socket 27 adapted to be aligned with the lower end of the bolt 23 when said rod 6 is shifted forwardly to high speed position as shown in Figure 2, and the bolt 23 will then be forced downwardly manually, so as to engage in said socket 27 for holding the rod 6 against movement with the high speed gear in mesh. Suitably mounted in the depending guards 28 carried by the top wall of the enlargement or casing 22 are a pair of spaced parallel rods 29 that are rigidly connected to move in unison as at 30, and one of the rods 29 is provided with an upstanding lug 31 adjacent the periphery of a plurality of superimposed tumbler discs 32. These tumbler discs are mounted upon vertical spindles which project through the top wall of the casing 22 and are provided with operating handles and dials as generally denoted at 33. Further details of this commutation locking device are not shown as the same is preferably conventional, but it is noted that by a particular manipulation of the tumbler discs 32, the notches 34 of said disc may be aligned with each other and with the lugs 31 so as to permit sliding movement of the bolt 29 carrying the lugs 31 in one direction, so as to permit said lugs 31 to move into said notches. Also the construction is such that these discs cannot be positioned by an unauthorized person with all of the notches 34 thereof aligned unless the particular combination is known to him. In this manner, with any one of the discs 32 positioned with its notch out of alignment with the lug 31, the bolt or rod 29 carrying said lug will be prevented from moving inwardly toward the axis of said disc.

The bolt 29 which carries the lug 31 is also provided with a lateral rigid lug 35 adapted to enter a notch 36 provided in one side of the upper end portion of the bolt 23 when the latter is depressed into the socket 27. In this manner, the disc 32 holds the bolts 29 in an outward position with the lug 35 engaged in the notch 36 so that said lug 35 retains the bolt 23 in depressed position for engaging in the socket 27, whereby the rod 6 is effectively locked in high speed position. On the other hand, when the notches of the disc 32 are aligned, the bolts 29 may be shifted so as to disengage the lug 35 from the notch 36 and permit the bolt 23 to be automatically raised, through the medium of the spring 26 so as to disengage said bolt 23 from the socket 27, whereupon the rod 6 is automatically released and allowed to be shifted through the medium of the gear shift lever 9.

In order to provide means for convenient shifting of the bolt 29 to either locking or unlocking position, the bolt 29 which is not in operative relation with the bolt 23 is provided with an upstanding pin 37 engaging in the bifurcation of a shifting fork 38 that is fastened to the lower end of a spindle of a handle 39 that is suitably journalled in the top wall of a casing 22.

The cover 10 is usually secured upon the casing 11 by means of suitable screws (not shown), adapted to pass through openings 40 in said cover and to be threaded into the upper edge of the casing 11. In order to guard against removal of this cover for permitting operation of the gears when they are locked with the reverse and high speed gears in mesh as shown in Figure 2, the bolt 41 is rigidly attached to the shifting portion 12 of the rod 6 and is adapted to enter aligned openings provided in a lug 42 carried by the cover 10 and in the upper portion of the casing 11. The bolt 41 is so proportioned as to retract from the opening of the casing 11 and lug 42 when the rod 6 is moved in neutral position as shown in Figure 3, so that the cover 10 may be readily removed at said time as is often necessary for repair and other purposes. However, the bolt 41 will be shifted with the rod 6 into locked position as shown in Figures 1 and 2 when the rod 6 is locked with the high speed gear in mesh as shown in Figure 2, and in this manner, the present locking device is made substantially "foolproof".

In operation, assuming that the transmission is in neutral position with the rods 5 and 6 disposed as shown in Figure 3, and that it is desired to lock the vehicle against unauthorized movement or use. The lever 9 is laterally tilted toward the left and then moved forwardly so as to rearwardly shift the rod 5 without influencing the rod 6. In this manner, the rod 5 is brought to the position shown in Figure 2, and the lever 9 is then tilted laterally in an opposite direction, so as to engage its lower end in the notch 15 of the rod 6 and disengage the same from the notch 7 of the rod 5. The lever 9 is then swung rearwardly for causing forward movement of the rod 6 to high speed gear position as shown in Figure 2, at which time the notch 21 is moved out of alignment with the spherical locking members 18 for causing the latter to be shifted laterally into the notch 19 of the rod 5. The locking members are prevented from moving out of the notch 19 by the unnotched portion of the rod 6 when the parts are thus disposed and the rod 5 is first effectively held against movement with the reverse gear in mesh. The bolt 23 is then depressed so as to engage in the socket 27, and handle 39 is rotated to shift the bolt 29 to engage the lug 35 in the lock 36 so as to effectively retain the bolt 23 in engagement with the socket 27, whereby the rod 6 is effectively locked with the high speed gear in mesh. The tumbler discs 32 are then rotated so as to bring their notches 34 out of alignment with each other and out of alignment with the lugs 31 so that the latter engages the periphery of said disc and the bolts 29 are thereby locked against sliding movement with the lugs 35 held in the notch 36 of the bolt 23. The gear shifting mechanism is thus positioned with both the reverse and high speed gears in mesh and locked against being disengaged except by an authorized person knowing the combination necessary to bring the notches 34 of the discs 32 into alignment with each other and with the lugs 31. It is noted that the device embodies a simple and practical modification of conventional forms of gear shifting mechanism, and involves the provision of means for automatically locking the reverse gear in mesh when the gear shift lever is operated to move the rod 6 for meshing with the high speed gear, thus requiring the manual manipulation of only one lock embodying the bolt 23.

It is obvious that with both the high speed and reverse gears in mesh, movement of the vehicle is absolutely prevented so that a very effective means is thus provided for preventing the theft of the vehicle. By reason of the provision of means for automatically locking the cover 10 upon the casing 11 when the rod 6 is in high speed position, the device is rendered additionally effective.

From the foregoing description, it is believed that the construction and operation as well as the advantages of the invention will be readily understood and appreciated by those skilled in the art.

Minor changes may be made without departing from the spirit and scope of the invention as claimed.

What I claim as new is:

1. In combination with the sliding rods of a motor vehicle gear shifting mechanism respectively movable in opposite directions for meshing the reverse and high speed gears of the transmission, and a gear shift lever selectively engageable with said rods for sliding the same one at a time, of means for permitting movement of one of the rods in one direction for meshing the reverse gear and for permitting subsequent movement of the other rod for meshing the high speed gear without disturbing the reverse gear, means to automatically lock the first named rod against movement with the reverse gear in mesh when the other rod is moved for meshing the high speed gear, and a manually operable lock for preventing movement of said other rod when positioned for meshing the high speed gear.

2. In combination with the sliding rods of a motor vehicle gear shifting mechanism respectively movable in opposite directions for meshing the reverse and high speed gears of the transmission, and a gear shift lever selectively engageable with said rods for sliding the same one at a time, of means for permitting movement of one of the rods in one direction for meshing the reverse gear and for permitting subsequent movement of the other rod for meshing the high speed gear without disturbing the reverse gear, means to automatically lock the first named rod against movement with the reverse gear in mesh when the other rod is moved for meshing the high speed gear, and a manually operable lock for preventing movement of said other rod when positioned for meshing the high speed gear, and means automatically operable upon movement of said outer rod to high speed position for automatically locking the cover of the transmission case.

3. A device of the class described comprising a casing having a pair of parallel longitudinally slidable rods mounted therein adapted for sliding movement in opposite directions for respectively meshing the reverse and high speed gears of a vehicle transmission gears, said rod being provided with notches in their inner sides, a gear shift lever movable selectively into said notches for selectively moving said rods, the rods for meshing the high speed gear being provided with a separate notch for reception of a gear shift lever when the other rod is in reverse gear meshing position, whereby the high speed gear may be meshed while the reverse gear is in mesh, means operable automatically to lock the rods for meshing the reverse gear, against movement, upon movement of the other rod for meshing the high speed gear, and a manually operable lock for preventing movement of the high speed gear meshing rod.

4. In combination with a transmission casing having a removable cover, and a gear shifting mechanism mounted on said cover including a plurality of rods movable in opposite directions for simultaneously meshing the reverse and high speed gears of said transmission mechanism, of means for simultaneously locking said rods against movement with the reverse and high speed gears meshed, and means operable upon meshing the high speed gear, for automatically locking the cover upon the transmission casing.

5. In a device of the class described, a slidably mounted rod adapted for movement rearwardly for meshing the reverse gear of a vehicle transmission mechanism, a second rod adapted to be moved forwardly for meshing the high speed gear of said transmission mechanism, said rod being provided with a pair of adjacent notches adapted to be transversely aligned when the rods are in neutral position, the second named rod being provided with a further notch adapted to align with the notch of the first named rod when the latter is moved rearwardly to reverse gear meshing position, and a gear shifting lever selectively movable into said notches for positioning the reverse and high speed gears simultaneously in mesh, means for locking the first named rod in reverse gear meshing position automatically upon moving the other rod to high speed gear meshing position, said second named rod being provided with a bracket, and a lock including a bolt adapted to be projected into said socket when the second named rod is in high speed gear meshing position.

6. In a device of the class described, a slidably mounted rod adapted for movement rearwardly for meshing the reverse gear of a vehicle transmission mechanism, a second rod adapted to be moved forwardly for meshing the high speed gear of said transmission mechanism, said rod being provided with a pair of adjacent notches adapted to be transversely aligned when the rods are in neutral position, the second named rod being provided with a further notch adapted to align with the notch of the first named rod when the latter is moved rearwardly to reverse gear meshing position, and a gear shifting lever selectively movable into said notches for positioning the reverse and high speed gears simultaneously in mesh, means for locking the first named rod in reverse gear meshing position automatically upon moving the other rod to high speed gear meshing position, said second named rod being provided with a bracket, and a lock including a bolt adapted to be projected into said socket when the second named rod is in high speed gear meshing position, the means for locking the first named rod in reverse gear meshing position comprising floating locking elements, said first named rod being provided with a notch into which said floating locking elements are forced when the second named rod is moved to high speed gear meshing position with the first named rod in reverse gear meshing position, said rods being further provided with a pair of notches adapted to be transversely aligned with each other and with the floating rocking element when said rods are positioned in neutral position whereby either of the rods are free to be moved from neutral position.

In testimony whereof I affix my signature.

ALBERT R. LONG.